United States Patent
Baumeister et al.

(10) Patent No.: US 10,050,764 B2
(45) Date of Patent: Aug. 14, 2018

(54) METHOD FOR COMMUNICATING DATA, COMMUNICATION CONTROLLER AND CIRCUIT ARRANGEMENT

(71) Applicant: Continental Teves AG & Co. oHG, Frankfurt (DE)

(72) Inventors: Daniel Baumeister, Aschaffenburg (DE); Ireneusz Janiszewski, Mühltal (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/895,011

(22) PCT Filed: May 15, 2014

(86) PCT No.: PCT/EP2014/059963
§ 371 (c)(1),
(2) Date: Dec. 1, 2015

(87) PCT Pub. No.: WO2014/195102
PCT Pub. Date: Dec. 11, 2014

(65) Prior Publication Data
US 2016/0119109 A1    Apr. 28, 2016

(30) Foreign Application Priority Data

Jun. 5, 2013 (DE) .......... 10 2013 210 465
Dec. 19, 2013 (DE) .......... 10 2013 226 765

(51) Int. Cl.
*H04L 5/14* (2006.01)
*G06F 13/42* (2006.01)
*H04L 5/26* (2006.01)

(52) U.S. Cl.
CPC ............ *H04L 5/14* (2013.01); *G06F 13/4291* (2013.01); *H04L 5/26* (2013.01)

(58) Field of Classification Search
CPC ....................................................... H04L 5/14
See application file for complete search history.

(56) References Cited

U.S. PATENT DOCUMENTS 5,797,038 A    8/1998    Crawford
6,378,017 B1   4/2002    Girzon
(Continued)

FOREIGN PATENT DOCUMENTS

CN    102819512 A    12/2012
DE    102011007437   5/2012
EP    1426841        6/2004

OTHER PUBLICATIONS

German Search Report for German Application No. 10 2013 226 765.7 dated Mar. 25, 2014, including partial translation.
(Continued)

*Primary Examiner* — John Blanton
(74) *Attorney, Agent, or Firm* — RatnerPrestia

(57) ABSTRACT

Method for communicating data between a first circuit and a second circuit, in particular a microcontroller unit and a mixed signal circuit of a motor vehicle control device, which is also distinguished by the fact that, during full duplex operation, data are serially transmitted between the first circuit and the second circuit and a transmitter of the data provides a clock signal, in particular for decoding data by a receiver. The invention also describes a communication controller and a circuit arrangement for carrying out the method.

13 Claims, 1 Drawing Sheet

(56) References Cited

U.S. PATENT DOCUMENTS

| | | | |
|---|---|---|---|
| 6,847,127 B1* | 1/2005 | Lee | B60L 11/1861 |
| | | | 290/40 C |
| 7,337,343 B2 | 2/2008 | Barrenscheen | |
| 2002/0183092 A1 | 12/2002 | Suzuki et al. | |
| 2004/0117496 A1* | 6/2004 | Mittal | H04L 29/06 |
| | | | 709/230 |
| 2005/0141534 A1* | 6/2005 | Kawabata | H04L 12/56 |
| | | | 370/411 |
| 2007/0201592 A1* | 8/2007 | Maiyuran | G06F 5/065 |
| | | | 375/372 |
| 2007/0268839 A1* | 11/2007 | Keating | H04L 12/2856 |
| | | | 370/254 |
| 2010/0060329 A1* | 3/2010 | Park | G11C 7/22 |
| | | | 327/141 |
| 2010/0182725 A1* | 7/2010 | Trapp | B60T 8/885 |
| | | | 361/93.1 |
| 2011/0072297 A1 | 3/2011 | Huang | |
| 2012/0166695 A1* | 6/2012 | Venus | G06F 13/4256 |
| | | | 710/110 |
| 2013/0231050 A1* | 9/2013 | Nakagawa | H04W 4/008 |
| | | | 455/41.2 |
| 2013/0262724 A1 | 10/2013 | Wegener | |
| 2014/0025856 A1* | 1/2014 | Pazhayakath | G06F 13/24 |
| | | | 710/260 |

OTHER PUBLICATIONS

International Search Report for International Application No. PCT/EP2014/059963 dated Jul. 9, 2014.
Chinese Office Action for Chinese Application No. 201480032068.6, dated May 31, 2017, including English translation, 14 pages.
Chinese Office Action for Chinese Application No. 201480032068.6, dated Apr. 18, 2018, 7 pages.

* cited by examiner

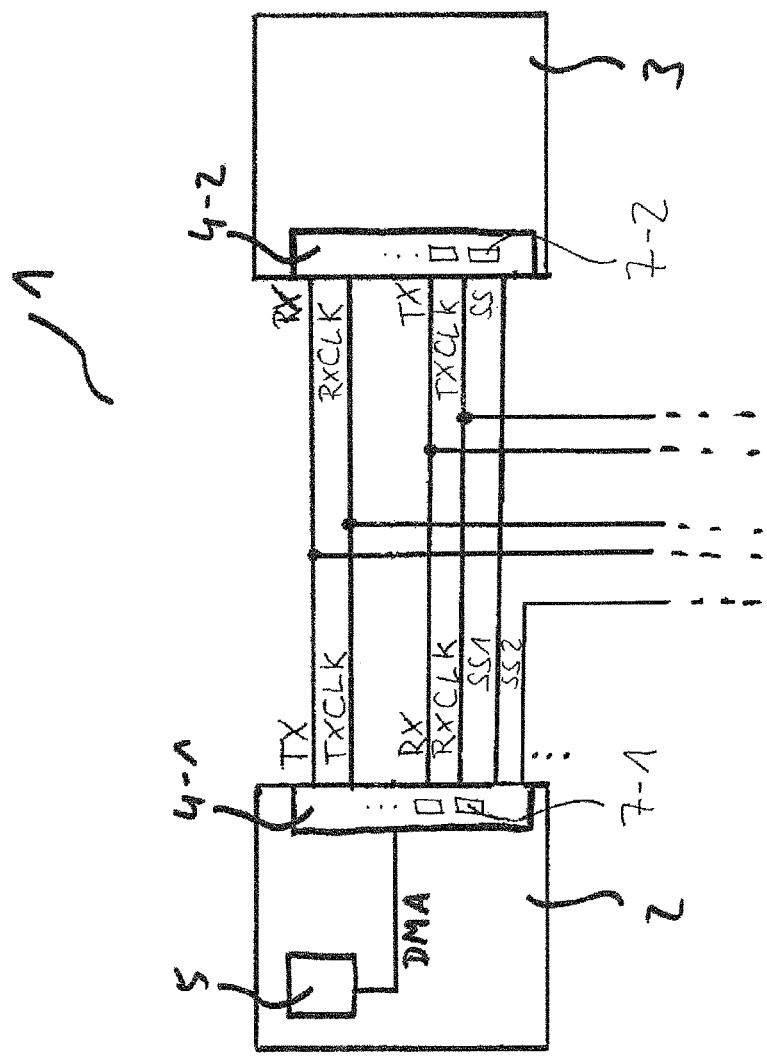

METHOD FOR COMMUNICATING DATA, COMMUNICATION CONTROLLER AND CIRCUIT ARRANGEMENT

CROSS REFERENCE TO RELATED APPLICATIONS

This application is the U.S. National Phase Application of PCT International Application No. PCT/EP2014/059963, filed May 15, 2014, which claims priority to German Patent Application No. 10 2013 210 465.0, filed Jun. 5, 2013 and German Patent Application No. 10 2013 226 765.7, filed Dec. 19, 2013, the contents of such applications being incorporated by reference herein.

FIELD OF THE INVENTION

The present invention relates to a data communication method, a communication controller and a circuit arrangement.

BACKGROUND OF THE INVENTION

Motor-vehicle electronic control units in particular for electronic or electro-hydraulic braking systems are known per se to comprise at least one microcontroller system consisting of a single-core or multicore microcontroller unit (MCU) and a single-core or multicore mixed-signal integrated circuit (mixed-signal IC) as a power control unit (PCU). The MCU is used in particular for performing the computations needed to operate the motor vehicle system, while the PCU is provided, for example, for driving power transistors in order to provide open-loop and closed-loop control of the motor vehicle system. MCU and PCU here communicate with each other via what is known, as a de facto standard, as a serial peripheral interface (SPI). The SPI works in duplex mode using five signal lines:
  SIMO—data signal: Slave In, Master Out;
  SOMI—data signal: Slave Out, Master In;
  SCK—clock signal output by the master; and
  two slave-select lines, which the master uses to specify the node, or slave, with which it wishes to communicate.

According to the configuration described here, the MCU is the master, which provides the clock signal. While the MCU is transmitting data to the PCU on the SIMO line, the PCU is simultaneously transmitting data to the MCU on the SOMI line. A half clock-signal period of the clock signal (SCK) is available for this circular communication. These SPI implementations provide prioritizable local data memories in the MCU, which allow SPI communication to be scheduled and executed efficiently in terms of transfer time. Polling-based control is used solely for transfers that cannot be scheduled. Such known MCU/PCU configurations thereby achieve transfer rates of the order of 8 to 11 MBd (megabaud) for example.

The limitation on the transfer rates of these known systems arises from the time constraints of the circular communication of the SPI interface, which is defined by the propagation of the clock signal from the master to the slave, and from the performance of the technology, in particular of the digital components of the PCU. The fabrication process for the PCU provides analog power transistors, analog transistors and digital transistors, and therefore cannot be optimized for the production of digital transistors. This means that the maximum achievable clock frequency is slower by a factor of 4 to 5 compared with the MCU, which can be optimized in this respect. Whereas the clock frequency of the MCU equals 120 to 160 MHz, for instance, only 20 to 40 MHz can hence be achieved by the internal clock of the PCU.

SUMMARY OF THE INVENTION

An aspect of the invention provides a microcontroller system for a motor-vehicle electronic control unit, which system comprises at least two circuits, in particular a microcontroller unit (MCU) and a mixed-signal IC (PCU) and allows an improved performance and/or higher transfer rates between the circuits.

An aspect of the invention relates to a method for data communication between a first circuit and a second circuit, in particular between a microcontroller unit and a mixed-signal IC of a motor-vehicle electronic control unit, which method is characterized in that in a full-duplex mode, serial data transmission takes place between the first circuit and the second circuit, and a clock signal, in particular for decoding data by a receiver, is provided by a transmitter of the data. The transfers between communication nodes, e.g. communication controllers, of the first circuit and of the second circuit are thereby advantageously decoupled, and it is possible to achieve optimum adaptation of the communication speed to a performance of the technology of the circuit concerned. Higher transfer rates between at least two circuits of different performance, which circuits are located, for instance, on an identical circuit board and/or in a shared IC package, can advantageously be achieved by the method according to the invention. A higher performance of a system comprising the circuits is likewise advantageously achieved. Critical factors such as transfer delays, for example, can hence be eliminated.

According to a preferred embodiment of the method, a clock signal, in particular for decoding data by a receiver, is provided by a transmitter of the data.

Unidirectional operation is preferably provided, wherein a transmitter of data, after the transmission, does not receive any information from a receiver about whether the message sent by means of the data was received correctly. This advantageously allows a reduction in a volume of incoming transferred data.

Data communication between at least one central processing unit, which is contained in the first circuit, and a communication controller contained in the first circuit preferably is performed by means of direct memory access. Potential transfer delays to application software executed by the circuit arrangement according to the invention, in other words by the first and/or the second circuit, can hence be reduced.

Multi-slave functionality is preferably provided, wherein a circuit acting as the master, in particular the first circuit, is designed such that it can communicate with a plurality of slaves.

An aspect of the invention also defines a communication controller for implementing the method according to the invention.

The communication controller comprises at least the following inputs and outputs:
  transmitter data output (TX);
  transmitter clock output (TXCLK);
  slave-select line(s) (SSn);
  receiver data input (RX); and
  receiver clock input (RXCLK).

For a number n of slaves, the communication controller preferably comprises n slave-select line(s) for selecting a slave with which communication is intended.

According to a preferred embodiment, the communication controller comprises FIFO memories, wherein separate FIFO memories are provided in particular for data to be transmitted, received data, direct memory access and interrupt functions.

An aspect of the invention also specifies a circuit arrangement in a motor-vehicle electronic control unit, in particular of a motor-vehicle braking system, which circuit arrangement comprises a plurality of circuits which are designed such that the circuits can communicate with one another and which additionally is characterized in that it comprises at least one communication controller according to the invention and/or implements the method according to the invention. A first circuit and a second circuit preferably have different performances, in particular different operating clock frequencies.

The first circuit is preferably a microcontroller unit, and the second circuit is preferably a mixed-signal IC for driving power electronics.

For the MCU and PCU and/or the communication controllers contained in said units, a higher abstraction level of a description language is preferably used during the design and/or development of this hardware, for instance an abstraction level such as the register-transfer level (RTL). In this case, by parameterizing the RTL description, elements such as e.g. the DMA interface that are purely specific to the MCU can be dispensed with in the PCU version in order to minimize advantageously the size of the circuit and hence the costs.

BRIEF DESCRIPTION OF THE DRAWINGS

Further preferred embodiments become apparent from the following description of an exemplary embodiment with reference to a FIGURE, where FIG. 1 is a schematic diagram of a microcontroller system 1 comprising microcontroller unit 2 (MCU) and mixed-signal IC 3 (PCU), which communicate via the communications interface according to an aspect of the invention.

DETAILED DESCRIPTION OF THE PREFERRED EMBODIMENTS

The method according to an aspect of the invention and/or the serial communications interface (MCU-PCU-Link: MPL) formed by the communication controllers 4-1 and 4-2 works in full-duplex mode, which implements a simultaneous, bidirectional data transfer between MCU 2 and PCU 3. According to this exemplary embodiment, the MCU 2 acts as the master, wherein the communication controller 4-1 contained in the MCU 2 comprises the following inputs and outputs:

transmitter data output TX
transmitter clock output TXCLK
slave-select line output 1 (SS1)
slave-select line 2 output (SS2)
receiver data input (RX)
receiver clock input (RXCLK)

The communication controller 4-2 contained in the PCU 2, which is designed as a slave, comprises the following inputs and outputs:

transmitter data output TX
transmitter clock output TXCLK
slave-select line input (SS)
receiver data input (RX)
receiver clock input (RXCLK)

The clock signal from the transmitter is provided as a source-synchronous clock by means of the transmitter-end TXCLK and the receiver-end RXCLK. The unit that is the data transmitter, e.g. MCU 2, generates the associated clock signal and provides this clock signal to the receiver, e.g. to the PCU 3, in particular for phase synchronization and/or for decoding the incoming data. If the operating clock frequencies of MCU 2 and PCU 3 are different, said units provide the data to be transmitted in each case also at these different frequencies, thereby decoupling the data transfers between MCU 2 and PCU 3. According to this example, communication controllers 4-1 and 4-2, in other words the MPL, also work unidirectionally, which means that the transmitter of data, after the transmission, does not receive any information from the receiver about whether the message transmitted by means of the data was received correctly.

The internal communication between the central processing unit (CPU) 5, which is contained in the MCU 2, and the communication controller 4-1 on the MCU 2 side, is performed by means of direct memory access DMA, wherein the DMA strategy replaces implementations known per se using prioritizable data memories. It is thereby possible to minimize the effect of transfer time on application software executed by microcontroller system 1.

The master uses the slave-select lines SSn to select the slave with which communication is meant to take place. For this purpose, the master, for instance the MCU 2 or communication controller 4-1 contained therein has a number n of slave-select lines SSn, which number n equals the number n of slave nodes that exist. Each slave or communication controller 4-2 contained therein has an input for the slave-select line SS. If a slave is selected for communicating with the master, it is ready for the communication to be performed, otherwise no monitoring takes place on the other clock lines and/or data lines of the bus. Other functional modules (not shown) acting as slaves can be provided, which is indicated in FIG. 1 by the additional select line SS2 and the branch lines from the other bus lines.

The communication controllers 4-1, 4-2 each comprise separate FIFO memories 7-1, 7-2 for instance for data to be transmitted, received data, direct memory access and interrupt functions.

The invention claimed is:

1. A method for data communication between a master circuit and a slave circuit, comprising:
communicating in full-duplex mode, between the master circuit and the slave circuit, by:
transmitting, by the master circuit to the slave circuit, a slave select signal to select the slave circuit, a master data signal and a master clock signal generated by the master circuit at a master clock frequency, the master clock signal used by the slave circuit to receive the master data signal at the master clock frequency; and
in response to receiving the slave select signal, transmitting, by the slave circuit to the master circuit, a slave data signal and a slave clock signal generated by a slave oscillator of the slave circuit at a slave clock frequency different from the master clock frequency, the slave clock signal used by the master circuit to receive the slave data signal at the slave clock frequency.

2. The method as claimed in claim 1, wherein the master circuit, after the transmission of the master data signal, does not receive any information from the slave circuit indicating whether the master data signal was received correctly.

3. The method as claimed in claim 1, wherein data communication between at least one central processing unit, which is contained in the first circuit, and a communication controller contained in the first circuit is performed by means of direct memory access.

4. The method as claimed in claim 1, wherein multi-slave functionality is provided, wherein a circuit acting as the master, in particular the first circuit, is designed such that it can communicate with a plurality of slaves.

5. The method as claimed in claim 1, wherein the data communication is between a microcontroller unit and a mixed-signal IC of a motor-vehicle electronic control unit.

6. A communication controller that implements a method according to claim 1.

7. The communication controller as claimed in claim 6, further comprising at least the following inputs and outputs:
- a transmitter data output (TX);
- a transmitter clock output (TXCLK);
- a slave-select line(s) (SSn);
- a receiver data input (RX); and
- a receiver clock input (RXCLK).

8. The communication controller as claimed in claim 7, further comprising FIFO memories, wherein separate FIFO memories are provided for data to be transmitted, received data, direct memory access and interrupt functions.

9. The communication controller as claimed in claim 6, further comprising FIFO memories, wherein separate FIFO memories are provided for data to be transmitted, received data, direct memory access and interrupt functions.

10. A circuit arrangement in a motor-vehicle electronic control unit, of a motor-vehicle braking system, the circuit arrangement comprises a plurality of circuits which are designed such that the circuits can communicate with one another, wherein the circuit arrangement comprises at least one communication controller according to claim 6 and implements a method for data communication between a first circuit of the plurality of circuits and a second circuit of the plurality of circuits, wherein in a full-duplex mode, serial data transmission takes place between the first circuit and the second circuit, wherein a clock signal, for decoding data by a receiver, is provided by a transmitter of the data.

11. The circuit arrangement as claimed in claim 10, wherein a first circuit and a second circuit have different operating clock frequencies.

12. The circuit arrangement as claimed in claim 11, wherein the first circuit is a microcontroller unit, and the second circuit is a mixed-signal IC for driving power electronics.

13. The circuit arrangement as claimed in claim 10, wherein the first circuit is a microcontroller unit, and the second circuit is a mixed-signal IC for driving power electronics.

* * * * *